United States Patent

Iwamoto et al.

[11] Patent Number: 5,813,497
[45] Date of Patent: Sep. 29, 1998

[54] METHOD AND APPARATUS FOR SERVING AND DISPLAYING FOOD

[76] Inventors: Yukio Iwamoto; Masako Iwamoto, both of 1 James Ave., Atherton, Calif. 94027

[21] Appl. No.: 803,293

[22] Filed: Feb. 20, 1997

Related U.S. Application Data

[62] Division of Ser. No. 620,098, Mar. 21, 1996, abandoned.

[51] Int. Cl.⁶ .................................................. B65G 53/02
[52] U.S. Cl. ............................................. 186/49; 114/253
[58] Field of Search ................................... 186/38, 42, 44, 186/49, 50; 104/59, 73; 273/140; 472/13; 114/219, 244, 253

[56] References Cited

U.S. PATENT DOCUMENTS

| | | | |
|---|---|---|---|
| 461,629 | 10/1891 | Garland | 472/13 |
| 597,838 | 1/1898 | Castle | 104/73 |
| 740,206 | 9/1903 | Voris . | |
| 1,219,692 | 3/1917 | Beltrami | 114/219 |
| 1,245,069 | 10/1917 | Vaidik | 114/219 |
| 1,357,995 | 11/1920 | Kitterman | 472/13 |
| 1,448,306 | 3/1923 | Lezert | 104/73 |
| 1,859,267 | 5/1932 | Kurz | 104/73 |
| 2,235,563 | 3/1941 | Ridgway | 104/73 |
| 2,604,055 | 7/1952 | Snowden | 104/73 |
| 3,391,758 | 7/1968 | Kinkaid et al. | 186/44 |
| 3,581,700 | 6/1971 | Storch | 114/219 |
| 3,701,224 | 10/1972 | Mozier | 52/27 |
| 3,807,806 | 4/1974 | Takahashi | 302/14 |
| 3,854,415 | 12/1974 | Lambert | 104/73 X |
| 3,865,041 | 2/1975 | Bacon | 104/73 |
| 4,165,075 | 8/1979 | Popovich | 273/140 |
| 4,429,867 | 2/1984 | Barber | 104/73 X |
| 4,560,032 | 12/1985 | Imanaka | 186/38 |
| 4,619,191 | 10/1986 | Dumas et al. | 104/73 |
| 4,840,253 | 6/1989 | DiMaggio et al. | 186/49 |
| 4,987,845 | 1/1991 | Camarota | 114/253 |
| 5,474,153 | 12/1995 | Iwamoto et al. | 186/49 |
| 5,566,782 | 10/1996 | Iwamoto et al. | 186/49 |

FOREIGN PATENT DOCUMENTS 561238  10/1923  France .

*Primary Examiner*—F. J. Bartuska
*Attorney, Agent, or Firm*—Townsend and Townsend and Crew LLP

[57] ABSTRACT

An apparatus (2) for serving and displaying food including a continuous watercourse (4) with food carriers (8) carrying various food trays. Patrons sit around a periphery of the watercourse. The food carriers are removably attached to an endless line (10) underneath the water by flexible wires (30) so that each food carrier is independently removable from the said watercourse. In addition, the flexible wires are positioned along the endless line so as to maintain a predetermined spacing between the food carriers in the watercourse. This predetermined spacing gives the patron adequate time to select sushi from adjacent food carriers and also gives the sushi chef adequate time to add sushi to adjacent food carriers.

13 Claims, 3 Drawing Sheets

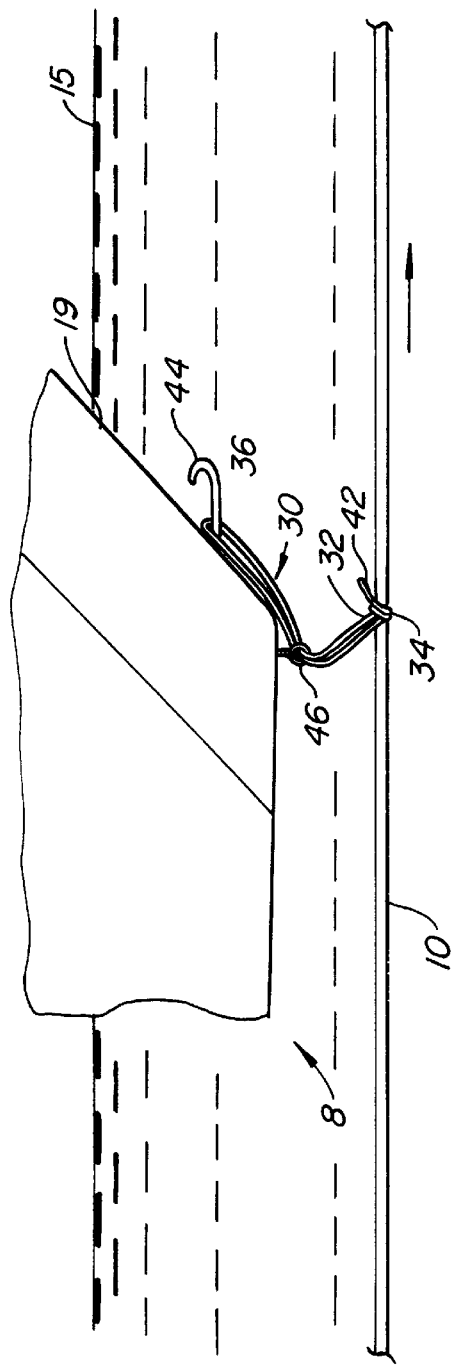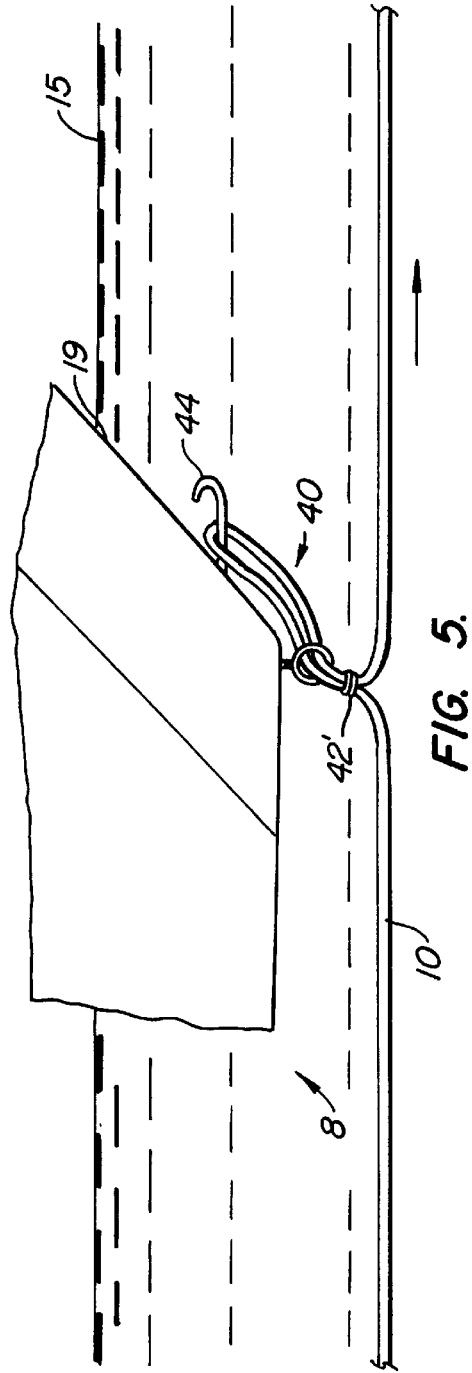

METHOD AND APPARATUS FOR SERVING AND DISPLAYING FOOD

This is a Division of application Ser. No. 08/620,098, filed Mar. 21, 1996, now abandoned, the disclosure of which is incorporated by reference.

BACKGROUND OF THE INVENTION

The present invention relates to the field of food delivery and service devices. More specifically, the present invention relates to a method and apparatus for continuously serving and displaying food to restaurant patrons.

The concept of displaying food along a circular path of travel before a group of patrons has enjoyed success in Japanese restaurants which serve sushi. In the traditional method of serving sushi, the patrons sit in front of the sushi chef and order sushi. A single sushi order is quite small and a single meal generally comprises a number of individual orders which requires a number of interactions between the patron and the sushi chef. The large number of transactions between the sushi chef and each patron limits the number of patrons a sushi chef can serve. Furthermore, making sushi is a relatively involved process. Thus, in the traditional method of serving sushi the patron can wait quite a long time before being served.

With the introduction of automatic food display and service systems, a sushi chef can serve a greater number of patrons while providing fresh sushi to the patron as soon as the patron is seated. One such food display system is disclosed in U.S. Pat. No. 4,560,032 to Imanaka. Imanaka discloses a continuous chain of small food carriers having the shape of boats arranged in a watercourse. The bow of each boat is physically attached to the stern of an adjacent boat via a chain or other interconnecting member. Food orders are placed on the boats which are circulated around the watercourse via a water current. Patrons seated around the watercourse remove the food orders from the boats as they pass by. A wide variety of sushi is placed on the boats for presentation to the patrons. The chef monitors and replenishes empty boats with the appropriate variety of sushi. In this manner the sushi chef can serve a greater number of patrons while continually presenting a wide variety of sushi to the patrons.

As can be appreciated, the device of Imanaka suffers from the disadvantage that the boats are directly connected together. Thus, removal of a single boat for repair or other reasons requires that the boat be severed from the continuous chain. Such a removal requires disabling the entire system. Disabling the system is obviously troublesome since the sushi cannot be served to the patrons during this time.

A further problem with Imanaka occurs when the watercourse must be cleaned. When preparing and serving sushi very sterile conditions are required due to the nature of the food. The food delivery system of Imanaka requires that each boat be disconnected from the line or, alternatively, all boats are removed at once to clean the watercourse. Either procedure can be quite time consuming.

SUMMARY OF THE INVENTION

The food service and delivery system of the present invention includes a plurality of food carriers floating in a continuous watercourse for serving and displaying different types of food. The food carriers are circulated around the watercourse, allowing patrons to remove food orders from the boats as they pass by. The food carriers are removably coupled to an elongate endless line, such as a wire, that extends around the watercourse underneath the water. The food carriers can be individually removed from the endless line for repair or any other reason without interrupting the circulation of the other food carriers.

In a specific configuration, the invention includes a plurality of fasteners for removably connecting the food carriers to the endless line. The fasteners are hidden from view so that the boats appear to be floating freely through the watercourse. The fasteners preferably each comprise a flexible elongate element, such as a wire, that has two ends connected together to form a loop. The loop is engaged to the food carrier and the two ends of the wire are connected to the endless line underneath the water. Alternatively, instead of incorporating separate fasteners, the flexible element may be formed from a portion of the endless line itself, i.e., by twisting a portion of the line to form a loop and tying the loop off with a tie, string, wire or the like.

Preferably, the food carriers are boats having a sloped bow and a stern. In this configuration, the boats may comprise an engaging element, such as a hook, extending from the bow of the boat. The loop portion of the flexible wire is wrapped around the hook to fasten the boat to the endless wire. To remove the boat from the watercourse, the user simply pulls the loop from the hook and removes the boat from the water. In this manner, the boat can be quickly and easily removed from the water without removing any of the other boats or disabling the system.

The fasteners are spaced from each other along the continuous line so that a predetermined spacing is maintained between the food carriers as they move around the watercourse. This predetermined spacing gives the patron adequate time to select sushi from adjacent food carriers and also gives the sushi chef adequate time to add sushi to adjacent food carriers. Preferably, the predetermined spacing is at least one quarter the length of the waterline of the food carriers.

Other features and advantages of the invention will appear from the following description in which the preferred embodiments have been set forth in detail in conjunction with the accompanying drawings.

BRIEF DESCRIPTION OF THE DRAWINGS

FIG. 4 is an enlarged side view of the food carrier of FIG. 2, illustrating a fastening assembly according to the present invention; and FIG. 5 is an enlarged side view of an alternative fastening assembly according to the present invention.

DESCRIPTION OF THE PREFERRED EMBODIMENT

Figure 1:
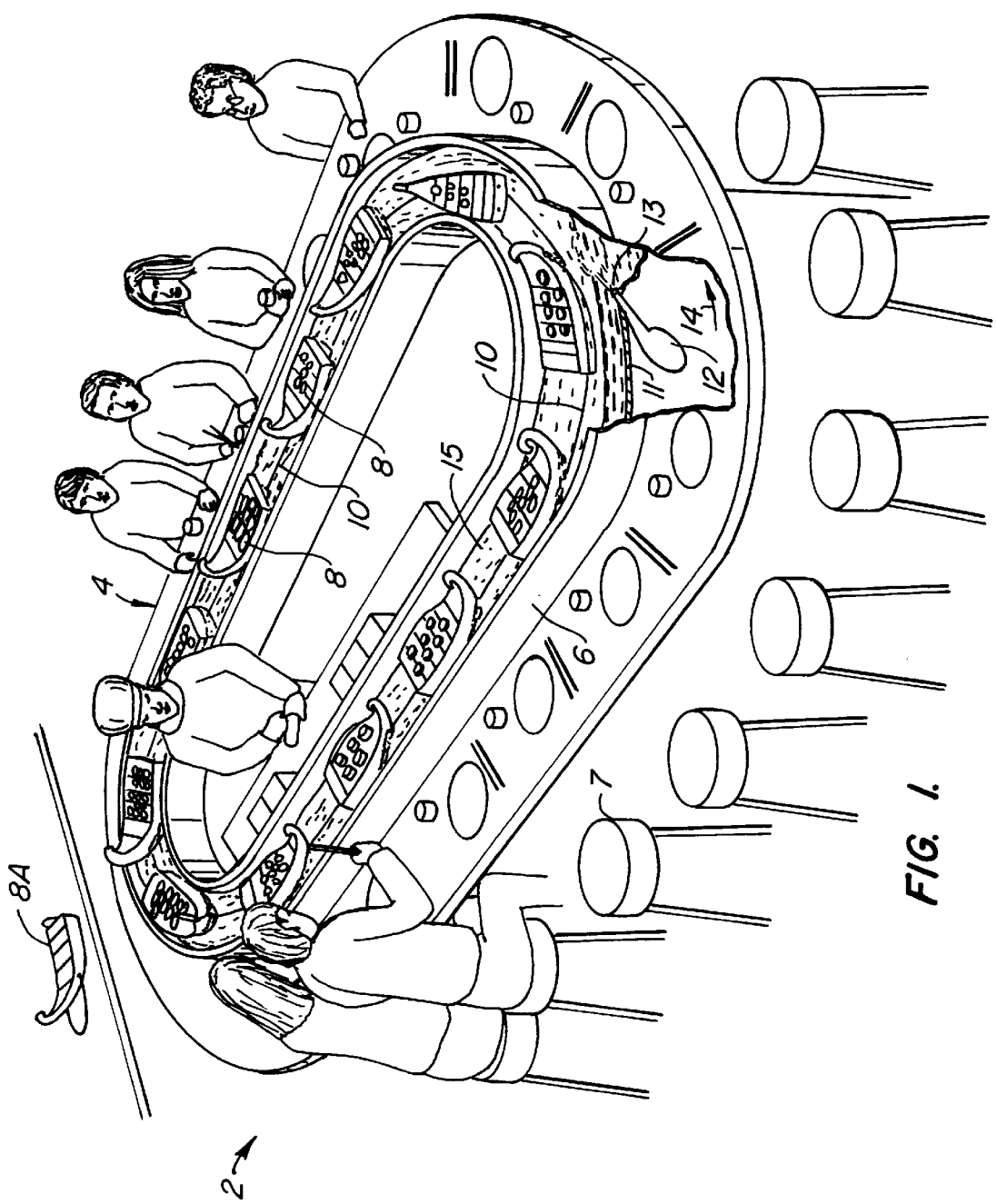
FIG. 1 shows a food display and service system including a watercourse and a number of individual, food carriers removably attached to a continuous line.

Referring to the drawings in detail, wherein like numerals indicate like elements, a food display and delivery system 2 is illustrated according to the principles of the present invention. As shown in FIG. 1, system 2 includes a continuous watercourse 4 having an outer periphery 6 about which seats 7 are positioned for seating patrons. A number of food carriers 8 in the form of boats float on the watercourse 4. The food carriers 8 are removably attached to an endless, continuous line 10 that extends around the watercourse 4 underneath the surface of the water. A pump 12 induces a current in the watercourse in the direction of arrow 14. The inlet 11 and outlet 13 of the pump 10 are fluidly coupled to the watercourse and are configured to induce the current.

The patrons observe the food carriers 8 as they float by and select the various foods presented on them. After the food on a food carrier has been removed, a food preparer adds an appropriate type of food depending upon the current variety available on the other food carriers. The food carriers may optionally include an indication of what type of food the food carrier carries so that the preparer does not have to monitor all of the food carriers. The indicators help the food preparer maintain a wide variety of the food.

As shown in FIG. 1, endless line 10 is positioned below the free surface 15 of the water so that the aesthetic appearance of the system is not compromised. Of course, line 10 may be fabricated so as to be aesthetically pleasing and then positioned above free surface 15, if desired. Line 10 is preferably an elongate resilient element, such as wire or fishing line, that is fabricated out of metal, bamboo, wood, plastic, or the like.

Figure 2:
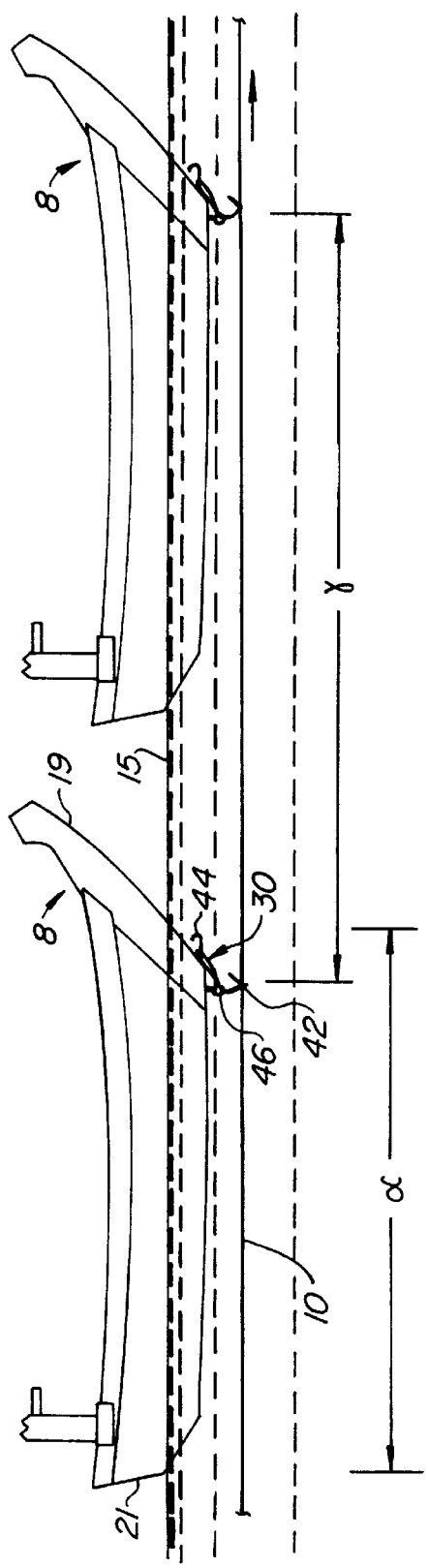
FIG. 2 is a side view of two of the food carriers in the watercourse coupled to a continuous line.
Figure 3:
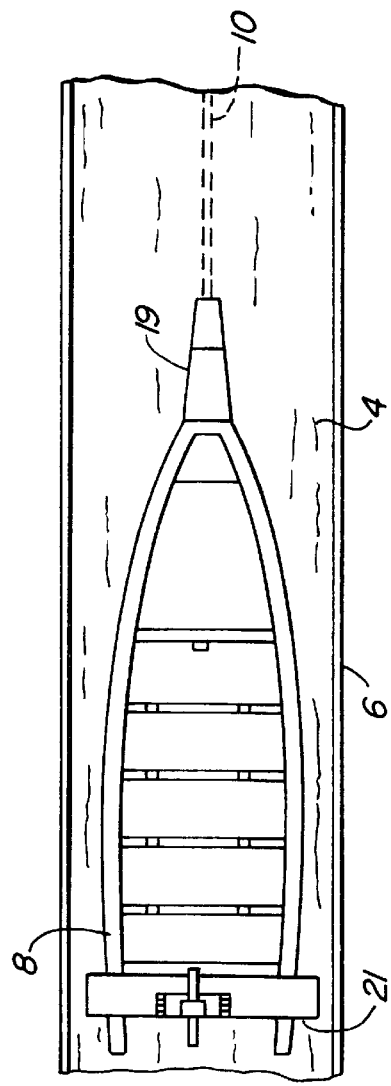
FIG. 3 is a plan view of one of the food carriers of FIG. 2.

As shown in FIG. 2, food carriers 8 are removably coupled to endless line 10 by a fastening assembly 20, which preferably includes an elongate flexible element, such as bamboo, string, metal or plastic wire, fishing line or the like. Preferably, the flexible element is a metal wire 30 that has sufficient flexibility to bend into a loop and sufficient strength to hold food carriers 8 to line 10. Each wire 30 has first and second ends 32, 34 and an intermediate portion 36 therebetween. First and second ends 32, 34 are brought together and connected to endless line 10 so that the intermediate portion 36 forms a loop that can be attached to one of the food carriers 8 (discussed below). As shown in FIG. 4, ends 32, 34 of wire 30 are preferably tied to line 10 by a suitable tie or wire 42. However, ends 32, 34 may be fastened to line 10 in other manners, such as water resistant adhesive, welding or the like It should be noted that the present invention may incorporate other means for removably fastening food carriers 8 to line 10. For example, a plurality of loops 40 may be formed from endless line 10 and tied off by ties 42' to form the fasteners, as shown in FIG. 5. Alternatively, endless line 30 may be directly attached to the bottom surface of food carriers with e.g., velcro or the like.

When food carriers 8 are in the form of a boat, they will include a stern 21 and a bow 19. In the preferred embodiment, each food carrier 8 will have an engaging element, such as a hook 44, extending from bow 19 to receive the intermediate or loop portion 36 of wire 30. In the preferred configuration, hook 44 extends outward from the bow 19 of the boat so that wire 30 loops around the front of the bow 19 and extends downward and rearward to endless line 10. Food carriers 8 also preferably include an eyelet 46 or its equivalent for receiving wire 30 and effectively ensuring that wire 30 will not disengage from hook 44. As shown in FIGS. 2 and 4, when line 10 is driven forward, it tenses wire 30 against eyelet 46 and hook 44 so that the food carrier follows line 10 through the water. This configuration will also allow endless line 10 to pull the boats through the water without dragging them underneath the free surface 15 (i.e., food carriers 8 will remain free to float on the free surface of the water).

As can be appreciated, food carriers 8 can be easily and quickly removed from endless line 10 by disengaging wire 30 from hook 44 and removing the carrier 8 from the watercourse 4. In this manner, an individual food carrier 8 may be removed for repair without interrupting the circulation of the other food carriers. The easily removable food carriers also facilitates cleaning the watercourse since the food carriers can be removed quickly without having to disconnect the food carriers from one another or without having to remove all of the food carriers at the same time. A stand-by food carrier 8A may be added to the watercourse to replace the removed food carrier. To accomplish this, an individual carrier is placed into the spot vacated by the previous carrier and the wire 30 is fed through eyelet 46 and wrapped around hook 44. Once line 10 begins to move, wire 30 will tense against eyelet 46 and hook 44, as discussed above.

The easily disconnected food carriers also advantageously permit selecting the appropriate number of food carriers at a given time. When sushi is served, for example, it is desired to provide a fresh product. Thus, it is undesirable to have the same food on the food carrier for an extended period of time. In order to turn the food over in a short period of time, the number of food carriers in the watercourse can be increased or decreased depending on the number of portions. The carriers permit a quick change in the number of food carriers. Thus, when a great number of patrons are being served a greater number of food carriers can be introduced into the watercourse. Conversely, when a small number of patrons are being served a lower number of food carriers may be provided.

As shown in FIG. 2, wires 30 are preferably coupled to endless line 10 at spaced locations along the line so that each food carrier 8 is spaced away from adjacent food carriers. This predetermined spacing γ gives the patrons time to select food from adjacent food carriers 8 and also gives the food preparer time to add food to adjacent carriers. The spacing also prevents the food carriers from contacting one another. The line also minimizes contact between the food carrier and watercourse wall 6 thereby reducing wear and tear on the food carriers.

As shown in FIG. 2, the food carrier has a length of the water line 50. The distance between adjacent food carriers along the water line is preferably at least one quarter the length of the water line α and more preferably at least one third the length of the water line α. To that end, the length of wires 30 and the distance between continuous line 10 and food carriers 8 are selected so that the food carriers will remain spaced from each other by at least one quarter the length of the water line α as the carriers are pulled along by continuous line 10.

Modification and variation can be made to the disclosed embodiments without departing from the subject of the invention as defined by the following claims. For example, size and shape of the spacer members may vary, the predetermined distance formed by the fasteners may vary, and the food carriers may take the form of a raft-like structure rather than a boat.

What is claimed is:

1. An apparatus for serving and displaying food comprising:
    a continuous watercourse having a watercourse width and an outer periphery, the continuous watercourse containing water having a free surface;
    a plurality of food carriers floating in the water;
    an elongate, continuous element extending around the watercourse under the free surface of the water, the continuous element being removably coupled to each food carrier, the food carriers being spaced from each other around the continuous element, and the continuous element being an endless line extending around the watercourse; and a plurality of fasteners coupling the food carriers to the endless line, the fasteners being spaced from each other to maintain a predetermined spacing between the food carriers, and the fasteners each comprising a flexible elongate element having first and second ends adjacent to each other so as to form a loop portion therebetween, the first and second ends being attached to the endless line and the loop portion being coupled to one of the food carriers.

2. The apparatus of claim 1 wherein the flexible elongate elements are each formed from a portion of the endless line.

3. The apparatus of claim 1 wherein the flexible elongate elements are separate from the endless line, the first and second ends of the flexible elongate elements being tied to the endless line.

4. The apparatus of claim 1 wherein the food carriers each comprise an engaging member for holding the loop portion of one of the fasteners.

5. The apparatus of claim 4 wherein the food carriers comprise boats having a bow and a stern, the engaging members each comprising a hook extending from the bow of the boat.

6. The apparatus of claim 5 further comprising an eyelet extending from a bottom of each boat, the loop portion of the flexible elongate elements being fed through the eyelet and over the hook to secure the respective boat to the endless element.

7. The apparatus of claim 1 wherein each of the flexible elongate elements have a length from the first and second ends to the loop portion and the endless line is positioned a distance away from a bottom surface of the food carriers, said length and said distance being selected so as to allow the respective food carrier to reciprocate in directions parallel to the watercourse relative to the endless line.

8. The apparatus of claim 7 wherein said length and said distance are selected so that the adjacent food carriers will remain spaced from each other at least ⅛ of the food carrier length.

9. A method for serving and displaying food comprising:

providing a continuous watercourse containing water and a continuous, elongate element extending around the watercourse underneath the surface of the water;

removably attaching a plurality of food carriers to the continuous element such that the food carriers freely float on the water surface, the removably attaching step comprising wrapping a loop portion of a flexible elongate element around an engaging element on the food carrier; and spacing the food carriers away from each other along the continuous element.

10. The method of claim 9 wherein the removably attaching step further comprises connecting first and second ends of the flexible elongate element to the continuous element.

11. The method of claim 10 wherein the removably attaching step further comprises forming the flexible elongate element with a portion of the continuous element.

12. The method of claim 11 wherein the forming step comprises forming a loop with said portion of the continuous element and binding first and second ends of the loop together.

13. The method of claim 10 wherein the removably attaching step further comprises tying the first and second ends of the flexible elongate element to the continuous element.

* * * * *